United States Patent [19]

Sankey et al.

[11] Patent Number: 4,778,110
[45] Date of Patent: Oct. 18, 1988

[54] MODULAR COMPOSITE CASCADE ASSEMBLY

[75] Inventors: Edward M. Sankey, Santee; Roy E. Cariola, San Diego, both of Calif.

[73] Assignee: Rohr Industries, Inc., Chula Vista, Calif.

[21] Appl. No.: 428,696

[22] Filed: Sep. 30, 1982

[51] Int. Cl.[4] .............................................. F02K 1/54
[52] U.S. Cl. ............................. 239/265.29; 244/12.5; 244/110 B
[58] Field of Search ....................... 239/265.19, 265.25, 239/265.27, 265.29, 265.31, 265.37, 500, 505; 52/394, 395, 396, 772; 244/12.5, 230, 110 B; 60/226.2, 228, 230

[56] References Cited

U.S. PATENT DOCUMENTS

| | | | |
|---|---|---|---|
| 2,742,776 | 4/1956 | Peirce | 52/772 |
| 2,808,136 | 10/1957 | Hammitt | 52/772 |
| 3,024,603 | 3/1962 | Tschudy | 239/265.29 X |
| 3,028,938 | 4/1962 | Schorr | 52/772 |
| 4,026,105 | 5/1977 | James | 239/265.29 X |
| 4,060,413 | 11/1977 | Mazzei et al. | 416/241 A X |
| 4,145,877 | 3/1979 | Montgomery | 60/226.2 |
| 4,356,973 | 11/1982 | Lawson | 239/265.31 |

Primary Examiner—Andres Kashnikow
Attorney, Agent, or Firm—Patrick J. Schlesinger; Frank D. Gilliam

[57] ABSTRACT

A cascade assembly for directing the gases externally of a jet aircraft engine in a forwardly direction when the engine is in a gas reversing mode. The cascade assembly comprises a plurality of cascade panel sections positioned in a side by side relationship over an opening in the engine nacelle. The panel sections have a plurality of spaced apart curvilinear vanes angled from the centerline of the engine. Longitudinal beams are positioned over the longitudinal edges and adjacent ends of at least one cascade panel section to secure it in place. The beam is "T" configured in the cross-section with feet or pads on each end to overlay the longitudinal outer edge and adjacent end surfaces of the cascade panel section or sections which it is securing in place. The pads or feet on the beam ends include apertures therethrough for securing the beams to aircraft structure. Both the cascade panel sections and beams are constructed of molded plastic or cured composite materials.

8 Claims, 2 Drawing Sheets

U.S. Patent  Oct. 18, 1988  Sheet 2 of 2  4,778,110
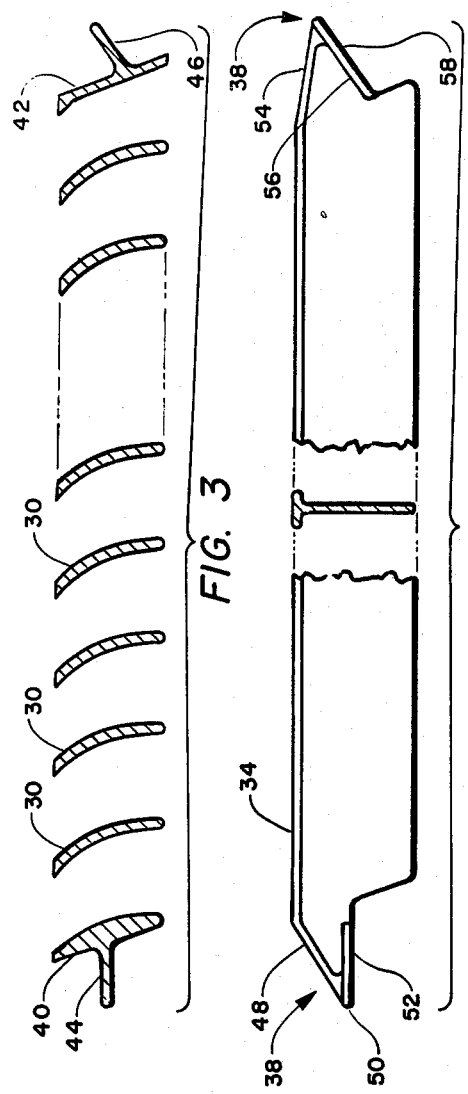
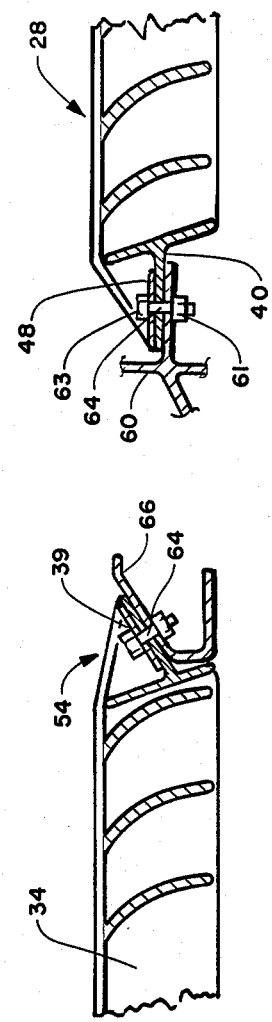
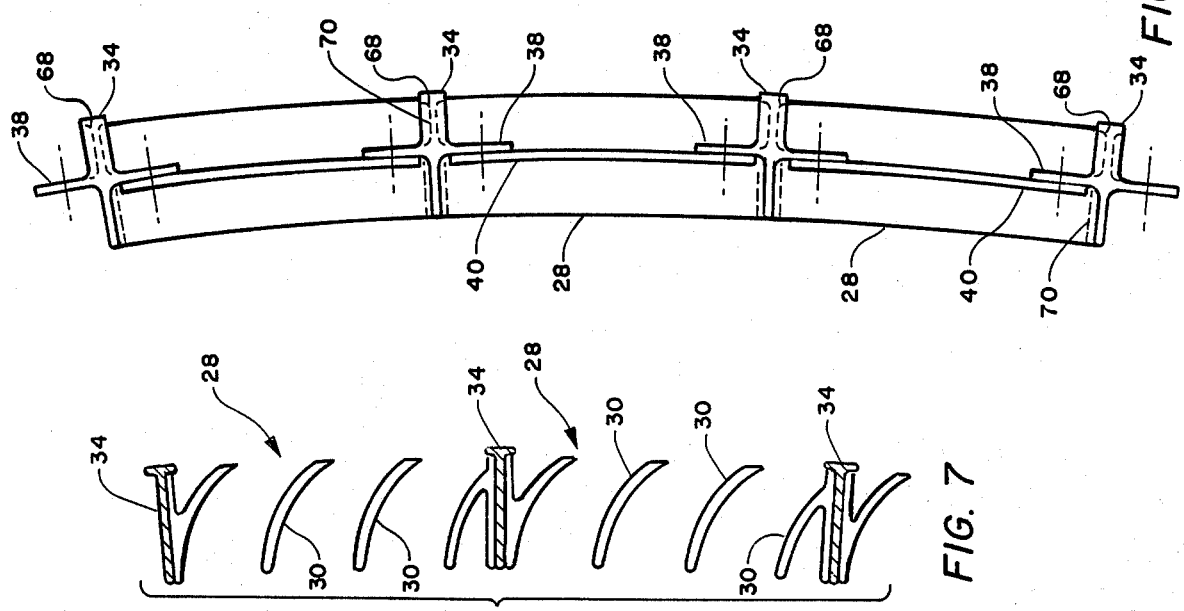

MODULAR COMPOSITE CASCADE ASSEMBLY

BACKGROUND OF THE INVENTION

This invention relates to thrust reversers for modern aircraft and more particularly to cascade assemblies used in association with engine reverser mechanisms to direct engine gases in a forwardly direction.

Cascade panel assemblies and their use is generally shown in U.S. Pat. Nos. 3,262,270; 4,030,291; 4,183,478 and 4,185,798.

In attempts to utilize one-piece composite cascade designs, either a heavy metal framework was required, or relatively inaccessible, mechanical fasteners extending through longitudinal walls of the "ladder" were utilized in order to provide the required strength in all directions.

U.S. Pat. No. 4,201,024 teaches a method of mounting and interlocking panels formed of molded plastic or cured composite materials. This device does not have sufficient strength nor vane configured for use as a cascade assembly.

All of the prior art thrust reversing cascades assemblies have various merits and have been used successfully. Their principal drawbacks have been excessive cost and weight.

SUMMARY OF THE INVENTION

The present invention obtains the various benefits of the prior art devices with a reduction of economic cost, weight and complexity. Generally stated, the modular composite assembly of the instant invention consists of a number of all-composite vane segments commonly referred to as "ladders" with integrated surrounding frames interlocked with a number of all-composite longitudinal spars referred to as "beams". The ladders and beams are bolted to each other, and to support rings at the leading and trailing edges of the cascade assembly.

The principal feature of this invention is the introduction of all-composite panel sections and longitudinal interlocked beams. This feature provides the required longitudinal strength and stiffness required to react to radial gas loads imparted to the ladders.

Yet another feature is the interchangeability or replaceability of any panel section by removal of a single beam and the removal of one set of the fasteners from an adjacent beam thereby allowing the cascade panel to be removed and replaced.

The above and other specific features of the instant invention will be readily apparent as the description continues while being read in conjunction with the appended drawings.

BRIEF DESCRIPTION OF THE DRAWINGS

FIG. 3 is a showing of FIG. 2 taken along line 3—3;

FIG. 4 is a showing of FIG. 2 taken along line 4—4 and includes a cross-section thereof;

FIG. 5 is a showing of FIG. 2 taken along line 5—5;

FIG. 6 is a showing of FIG. 2 taken along line 6—6;

FIG. 7 is a showing of FIG. 2 taken along line 7—7; and

FIG. 8 is a showing of an end view of FIG. 1 looking to the right from the FIG. 1 illustration.

DETAILED DESCRIPTION OF THE DISCLOSURE

Figures 1, 2:
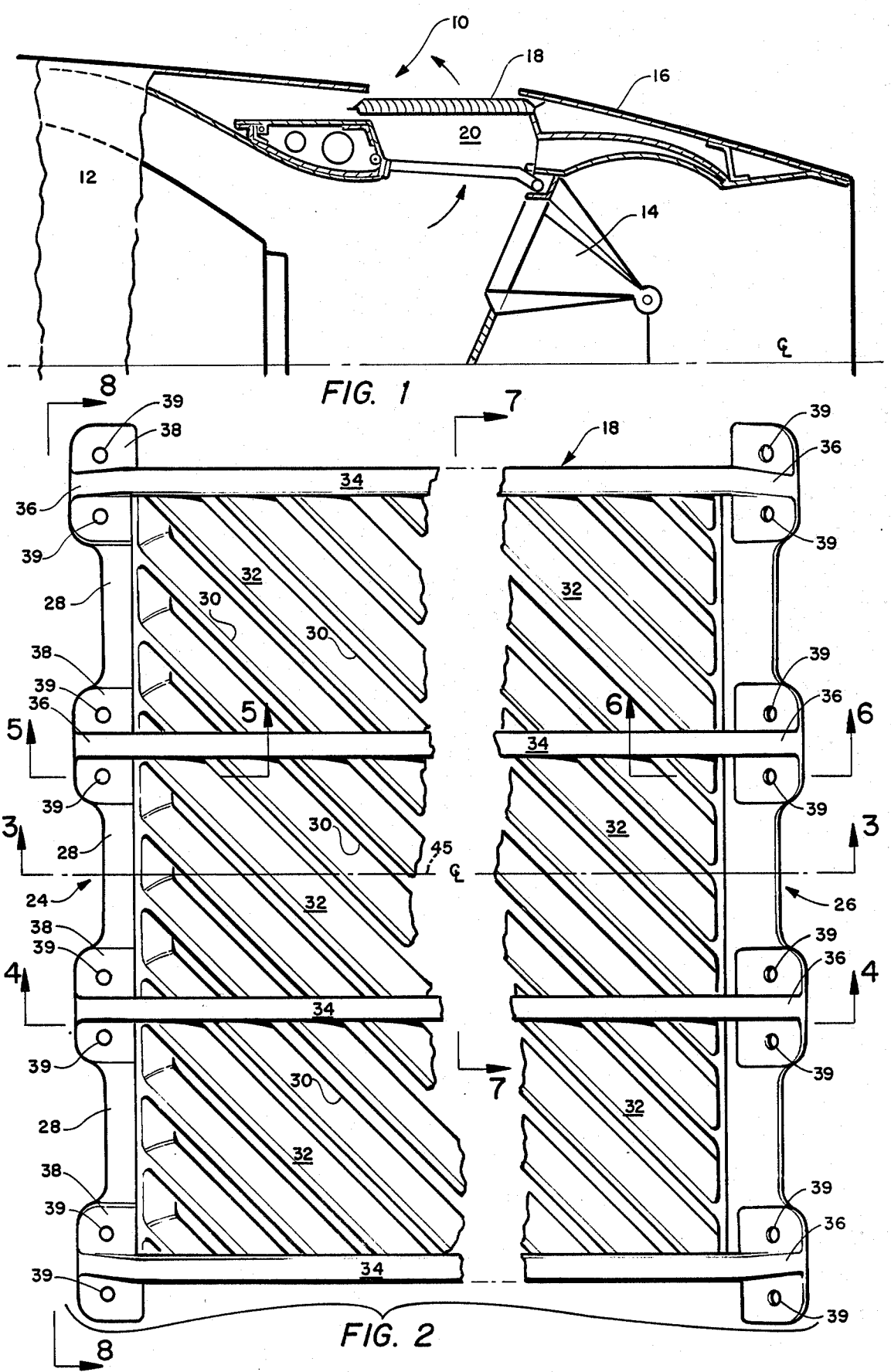
FIG. 1 illustrates a typical application for a thrust reverser cascade.
FIG. 2 illustrates a plan view of the thrust reverser cascade of the invention.

Throughout the drawing figures and specifications, the same numerals are used to depict the identical elements or parts.

Referrring now to FIG. 1 in particular, this figure shows a side cutaway view of the upper half of a substantially symmetrical engine nacelle 10 commercially used on modern airplanes to enclose a jet type engine 12. The blocker doors 14, rearward translatable nacelle section 16 and a cascade assembly 18 are shown positioned in a thrust reversing mode wherein the opening 20 through the nacelle allows for engine gases to exit the side of the engine 12 rather than rearward in a normal fashion and be directed forwardly by a cascade assembly 18 in the direction of the arrow exiting the opening 20. The operation of the engine gas reversing mechanism is fully described in U.S. Pat. No. 4,185,798 assigned to the assignee of this invention.

Referring now to FIG. 2, the cascade assembly 18 is shown in plan view with the left side 24 of the figure considered to be the forward end and the right side 26 of the figure considered to be the aft end. Three cascade panels 28 are shown for ease of explanation and it should be understood that less than or more than three can be utilized equally as well to practice this invention. Each of the cascade panels 28 have a plurality of vane segments or ladders 30. The vane segments or ladders 30 are spaced apart to provide a plurality of openings 32 from which the engine gases exit the engine during thrust reversing. The vane segments or ladders 30 are angled from the engine centerline from 0° to 42°. Ideally the angle will be substantially 42°.

The cascade panels 28 are positioned one adjacent the other, for example, three being shown in FIG. 2, and are removably secured in place by a plurality of beams 34, as per the four beams also shown in FIG. 2 and with a plurality of suitable fasteners, hereafter explained in detail. As shown the outermost beams 34 secure only one cascade panel 28 while the two intermediate beams 34 each secure two cascade panels 28. These beams are identical, as hereafter discussed, and may therefore, be interchanged to secure either one or two cascade panels 28 to the aircraft.

The ends 36 of the beams are configured to form a pad or foot 38 which have a pair of spaced apart apertures 39 therethrough. The configuration and purpose of the pad 38 will hereafter be more fully described.

The cascade panels 28 and the beams 34 are preferably constructed of non-metallic material, such as by way of example and not by way of limitation, molded plastic or cured composite materials. Examples of such materials are NYLON 6/6/40% GRAPHITE FIBER, RC-1008 manufactured by LNP Corp., ZYTEL 77G-43NC-10 manufactured by Dupont Corporation, etc.

Referring now to FIG. 3, this is a showing taken along line 3—3 of FIG. 2 which shows a section taken through the vane segments or ladders 30 of a cascade panel 28. As can be seen, the upstream surface of the frame members 40 and 42 are curvilinear like the ladders to direct the engine gases forward of the engine. The forward frame member 40 includes a pad 44 which is substantially parallel with the longitudinal center line 45 (see FIG. 2) of the panel and the downstream frame member 42 includes a pad 46 which is angled from the panel longitudinal center line.

Referring now to FIG. 4 taken along line 4—4 of FIG. 2, this figure depicts a side and cross-sectional view of the beam 34 with the cascade panel section omitted for clarity. The forward end 48 of beam 34 includes an overhang 50 with its surface 52 forming the pad or foot 38 which is configured to mate with pad 44 of front frame member 40 and the aft end 54 of the beam 34 includes an overhang 56 with its surface 58 forming the pad or foot 38 which is configured to mate with pad 46 of aft frame member 42. As shown in the center of the beam of FIG. 4, the cross-section of beam 34 is substantially "T" shaped.

Referring now to FIG. 5, the figure depicts a view taken along line 5—5 of FIG. 2 which shows a typical cascade section and beam attachment to a forward aircraft attached support ring 60. As can be seen the pad 44 of frame member 40 of the cascade section is sandwiched between the support ring 60 and the end 48 of the beam 34. The attachment of the frame member and the beam is by way of a fastener which comprises a lock nut 61 attached to the under side of the support ring 60 and a bolt 63. The bolt passes through aligned apertures 39 and 64 through the beam 34 and the frame member 40 of a cascade panel 28 respectively.

Referring now to FIG. 6, the figure depicts a view taken along line 6—6 of FIG. 2 which shows the aft connection of a cascade panel and beam to a second aircraft attached support ring 66 by similar aligned apertures 39 and 64 through the aft end 54 of beam 34 and aft frame member 42 respectively by means of a lock nut 61 and bolt 63.

FIG. 7 depicts a view taken along line 7—7 of FIG. 2 and shows the beam and cascade panel relationship of the cascade assembly.

Referring now to FIG. 8 which depicts an end view showing of the cascade assembly 10 looking aft. The beams 34 capture upper surface 68 of at least one adjacent cascade panel 28. The intermediate beams 34 capture two adjacent panels 28 while the end most beams capture only one adjacent cascade panel 28. The pad or feet 38 of the beams 34 extend in both directions and are positioned in the case of the intermediate beams over two longitudinal cascade panel frames 70 and the front edge of cascade panel frames 40, 42, and in the case of the outside beams over one adjacent cascade panel frames. As hereinbefore described a lock nut and bolt combination with the bolt passing partially through aligned apertures in the pad or feet 38 and the frames 40, 42 (the bolthead preventing the bolt from passing through the apertures) into the lock nut attached to a forward or aft support ring.

It should be understood that a cascade panel can be removed from the assembly by removing the bolt from the lock nut at each support ring and removing the beam from the support ring adjacent the opposite edge surface of the cascade panel. A new panel can be installed and secured in place in the opposite manner.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed is:

1. An improved cascade assembly associated with thrust reversing mechanism of an aircraft engine comprising:
   a plurality of vane segments angled from the centerline of said engine in a spaced apart relationship formed as an integral one piece non-metallic cascade panel; and
   a plurality of non-metallic beams fixedly attachable to said engine parallel with the centerline of said engine for removably clamping at least one cascade panel in place on said engine.

2. The invention as defined in claim 1 wherein said vane segments are curvilinear in cross-section.

3. The invention as defined in claim 1 wherein said vane segments are angled from said engine centerline from 0° to 42°.

4. The invention as defined in claim 1 wherein said vane segments are angled from said engine centerline at substantially 42°.

5. The invention as defined in claim 1 wherein said cascade section and said beams are constructed of injection molded plastic.

6. The invention as defined in claim 1 wherein said cascade section and said beams are constructed of cured composite materials.

7. The invention as defined in claim 1 wherein the cross-section configuration of said beams is substantially "T" shaped, whereby at least one arm of the upper "T" surface overlays an edge of one of said cascade sections.

8. The invention as defined in claims 1 or 7 wherein the distal ends of each of said beams include pads for securing that beam to said aircraft engine.

* * * * *